United States Patent
Son et al.

(10) Patent No.: US 7,296,459 B2
(45) Date of Patent: Nov. 20, 2007

(54) AVATAR REFRIGERATOR, AND METHOD FOR SENSING CONTAMINATION OF THE SAME

(75) Inventors: Ku-Young Son, Busan (KR); Eun-Jeong Kim, Changwon-shi (KR); Eun-Young Park, Ulsan (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/359,625

(22) Filed: Feb. 23, 2006

(65) Prior Publication Data

US 2007/0039376 A1    Feb. 22, 2007

(30) Foreign Application Priority Data

Aug. 18, 2005    (KR)    ............ 10-2005-0075775

(51) Int. Cl.
*G01N 7/00*    (2006.01)
*F25B 49/00*    (2006.01)

(52) U.S. Cl. ............ 73/31.02; 73/31.03; 62/127; 340/870.11; 340/632

(58) Field of Classification Search ........... 73/31.02, 73/31.03, 31.01, 23.2, 23.34; 62/127; 340/870.11, 340/632

See application file for complete search history.

(56) References Cited

U.S. PATENT DOCUMENTS

| | | | |
|---|---|---|---|
| 6,422,061 B1 * | 7/2002 | Sunshine et al. | 73/29.01 |
| 6,678,685 B2 * | 1/2004 | McGill et al. | 707/10 |
| 7,114,343 B2 * | 10/2006 | Kates | 62/126 |
| 2002/0144537 A1 * | 10/2002 | Sharp et al. | 73/31.01 |
| 2006/0090482 A1 * | 5/2006 | Dawes | 62/126 |
| 2006/0130498 A1 * | 6/2006 | Joshi et al. | 62/127 |

FOREIGN PATENT DOCUMENTS

| | | | |
|---|---|---|---|
| JP | 10-170422 | * | 6/1998 |
| JP | 2001-041640 A | * | 2/2001 |
| JP | 2001-330365 A | * | 11/2001 |
| JP | 2001-355957 A | * | 12/2001 |
| JP | 2003-247773 A | * | 9/2003 |
| WO | WO2005-047788 | * | 5/2005 |

OTHER PUBLICATIONS

Stephen Intille and Kent Larson, "Designing and Evaluating Supportive Technology for Homes", at http://web.archive.org/web/*/http://web.media.mit.edu/~intille/papers-files/IntilleLarson03.pdf, archived Jan. 27, 2005.*

* cited by examiner

*Primary Examiner*—Michael Cygan
(74) *Attorney, Agent, or Firm*—Ked & Associates, LLP

(57) ABSTRACT

The present invention discloses a refrigerator for storing foods at a low temperature. An avatar refrigerator and a method for sensing contamination of the same receive measurement values from various sensors installed around the refrigerator in a contamination sensing mode, decide kinds and degrees of contamination in each position by analyzing the measurement values of the sensors by a control means, decide contamination solving methods, and display the kinds and degrees of contamination in each position and the contamination solving methods through a display means formed at the refrigerator door side with avatars. As a result, the avatar refrigerator and the method for sensing contamination of the same maintain the clean air environment and improve health by notifying the air contamination in the peripheral regions of the refrigerator installed at the center of the residential space and the contamination solving methods as well as freshly maintain the foods by storing the foods at a low temperature.

21 Claims, 4 Drawing Sheets

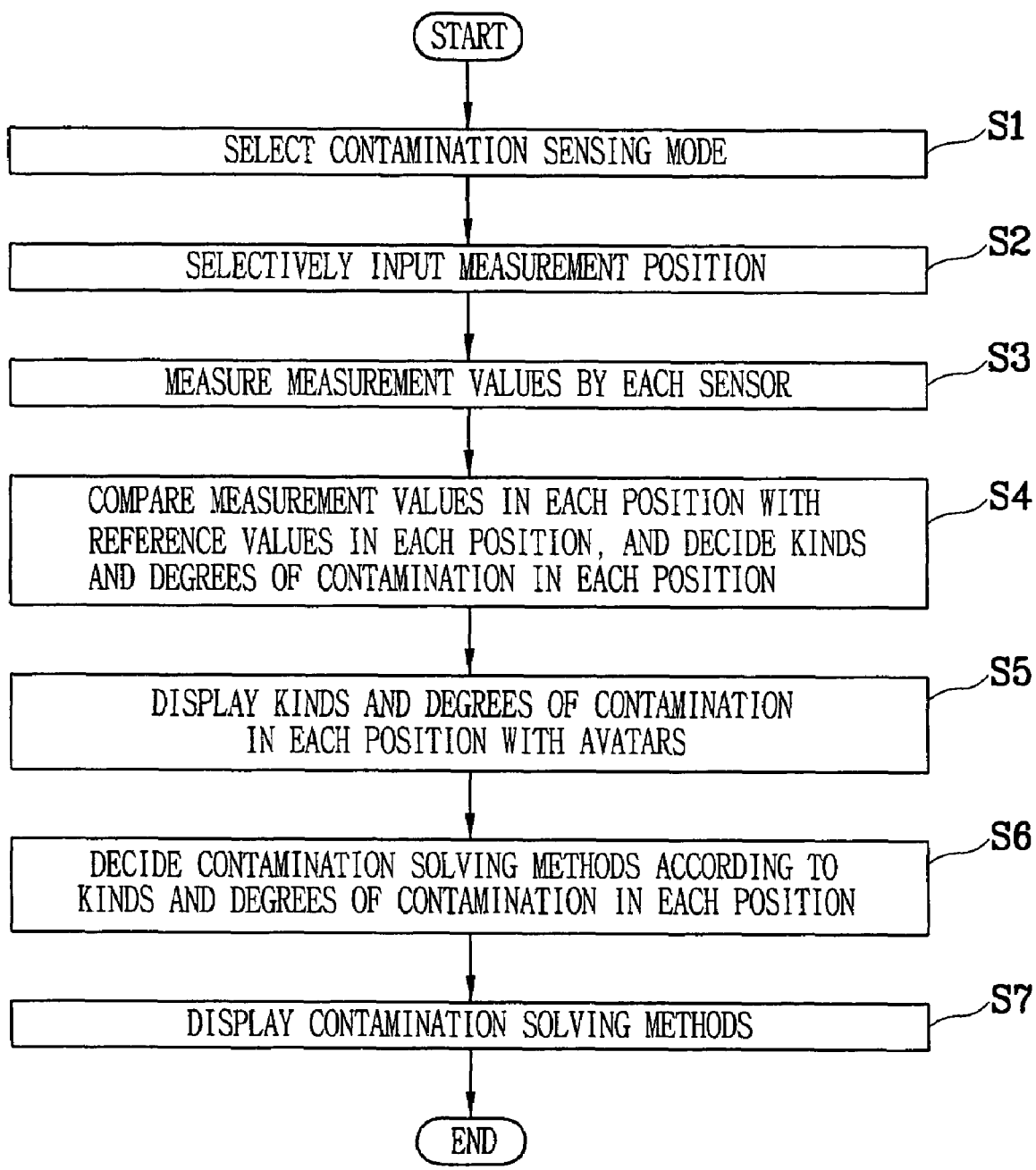

AVATAR REFRIGERATOR, AND METHOD FOR SENSING CONTAMINATION OF THE SAME

TECHNICAL FIELD

The present invention relates to a refrigerator for storing foods at a low temperature, and more particularly, to an avatar refrigerator which can sense contamination around an installation position, and display degrees and/or kinds of contamination in each position with avatars, and a method for sensing contamination of the same.

BACKGROUND ART

In general, a refrigerator is an apparatus for freshly storing foods at a low temperature for an extended period of time, by maintaining a low temperature in a freezing chamber and a refrigerating chamber by using cool air. With the development of the industrial society, the refrigerators have been used in each house by enormous demand and supply.

The refrigerator has a freezing cycle including, as basic components, a compressor for compressing refrigerants into high temperature high pressure gas refrigerant, a condenser for condensing the refrigerant from the compressor into high temperature high pressure liquid refrigerant, an expansion valve for decompressing the refrigerant from the condenser into low temperature low pressure liquid refrigerant, and an evaporator for evaporating the refrigerant from the expansion valve into low temperature low pressure gas refrigerant, absorbing heat from the freezing chamber or the refrigerating chamber, and maintaining a low temperature in the freezing chamber or the refrigerating chamber.

On the other hand, people intend to make the indoor air fresh with the growing interest in health. However, in order to improve utilization of a restricted residential space, a kitchen and a living room are opened as the dining-living area, and electric home appliances including the refrigerator are mostly installed in the dining-living area. Accordingly, gas is possibly leaked from a gas range in the kitchen, dusts flow in the living room through a veranda or window, and moisture causing errors of the electric home appliances increase by various factors.

Recently, the refrigerator installed at the center of the residential space is required to have a function of deciding contamination of the indoor air and providing contamination solving methods.

DISCLOSURE OF THE INVENTION

The present invention is achieved to solve the above problems. An object of the present invention is to provide an avatar refrigerator and a method for sensing contamination of the same which can sense contamination of the peripheral regions of the refrigerator installed at the center of the residential space, and display the contamination with avatars.

Another object of the present invention is to provide an avatar refrigerator and a method for sensing contamination of the same which can sense contamination in each position through the refrigerator installed in the residential space, and display the contamination with avatars.

Yet another object of the present invention is to provide an avatar refrigerator and a method for sensing contamination of the same which can sense contamination in the peripheral regions of the refrigerator installed at the center of the residential space, and provide contamination solving methods.

In order to achieve the above-described objects of the invention, there is provided an avatar refrigerator, including: various sensors installed in an indoor space in which the refrigerator has been installed, for sensing contamination of the ambient air; a control means built in the refrigerator, for receiving the sensed data from the sensors and deciding degrees and/or kinds of contamination of the indoor space in a contamination sensing mode; and a display means installed at one side of the refrigerator to be connected to the control means, for displaying the degrees and/or kinds of contamination of the indoor space with avatars in the contamination sensing mode.

The control means can display the degrees and/or kinds of contamination of the indoor space through the display means to correspond to the avatars.

Preferably, the control means sets contamination solving methods according to the degrees and/or kinds of contamination sensed by the sensors, and displays the contamination solving methods through the display means with the avatars.

Preferably, the sensors are randomly installed in the positions of the indoor space, and the control means receives the measurement values and installation positions of the sensors, decides the degrees and/or kinds of contamination in each position, and displays the degrees and/or kinds of contamination through the display means.

More preferably, the sensors include at least one of smell sensors for sensing a composition ratio of gas generating smell in the air, humidity sensors for sensing a humidity, and dust sensors for sensing a dust quantity in the air.

Preferably, the sensors and the control means communicate with each other by infrared data association or Bluetooth, so that the measurement values of the sensors can be transmitted to the control means.

Preferably, the control means receives the measurement values from the sensors at a preset time or time interval or intermittently receives the measurement values from the sensors in the contamination sensing mode.

According to another aspect of the invention, there is provided a method for sensing contamination of an avatar refrigerator, including: a measurement step for measuring various measurement values of the air in an indoor space in which the refrigerator has been installed; a decision step for receiving various measurement values measured in the measurement step, and deciding degrees and/or kinds of contamination of the indoor space; and a display step for displaying the degrees and/or kinds of contamination of the indoor space decided in the decision step with avatars.

Preferably, the decision step includes a step for setting contamination solving methods according to the degrees and/or kinds of contamination, and the display step includes a step for displaying the contamination solving methods with avatars.

Preferably, the measurement step includes a step for randomly measuring various measurement values of the air in each position of the indoor space, the decision step includes a step for receiving various measurement values of the air in each position, and deciding the degrees and/or kinds of contamination in each position, and the display step includes a step for displaying the degrees and/or kinds of contamination in each position.

Preferably, the measurement values of the air measured in the measurement step include at least one of a composition ratio of gas generating smell in the air, a humidity and a dust quantity of the air.

Preferably, the decision step includes a step for previously receiving various measurement values of the air by infrared data association or Bluetooth.

Preferably, the decision step receives various measurement values of the air at a preset time or time interval, or intermittently receives various measurement values of the air.

BRIEF DESCRIPTION OF THE DRAWINGS

The present invention will become better understood with reference to the accompanying drawings which are given only by way of illustration and thus are not limitative of the present invention, wherein:

FIG. 4 is a flowchart showing sequential steps of a method for sensing contamination of an avatar refrigerator in accordance with the present invention.

BEST MODE FOR CARRYING OUT THE INVENTION

An avatar refrigerator and a method for sensing contamination of the same in accordance with the present invention will now be described in detail with reference to the accompanying drawings.

Figure 1:
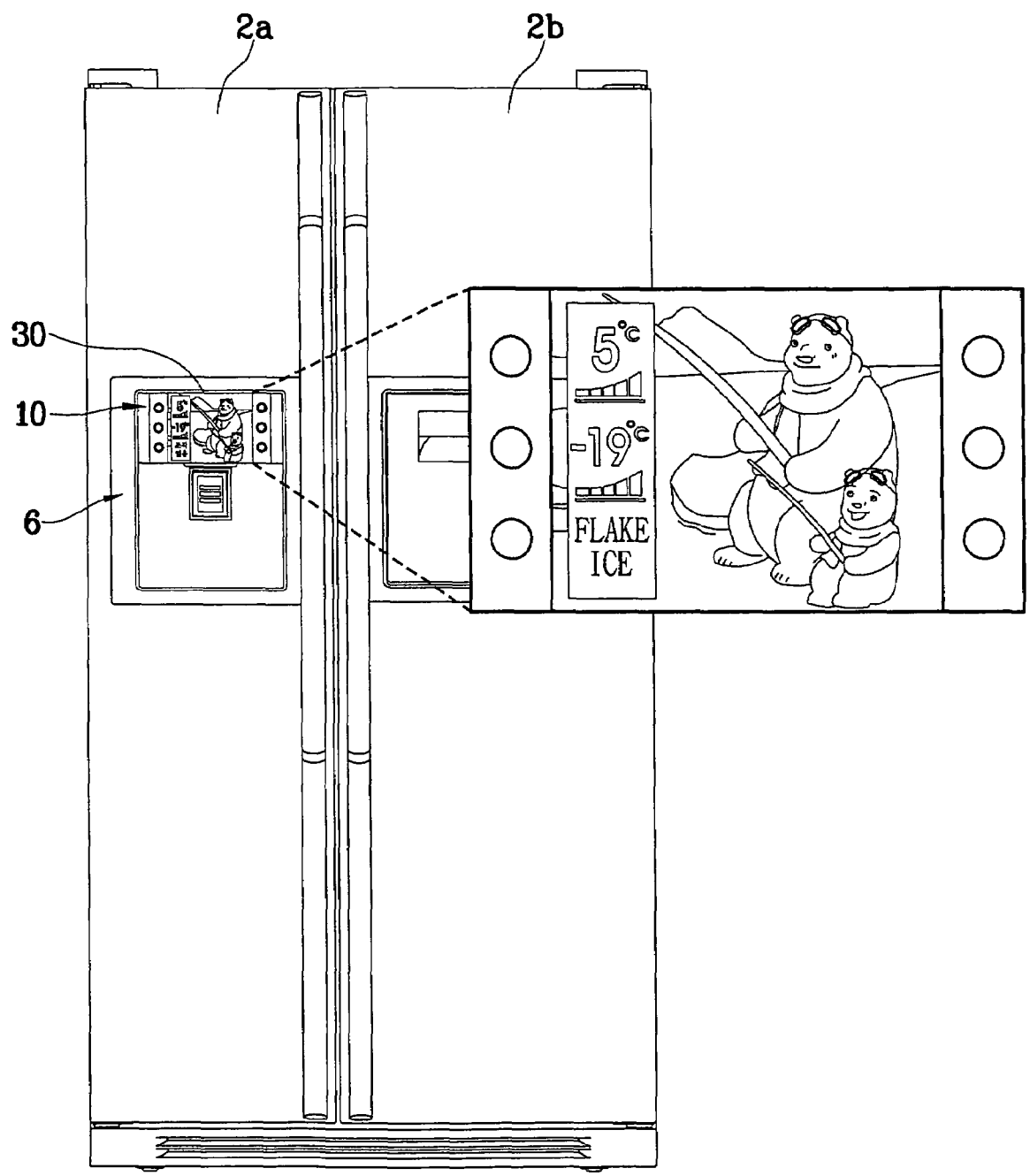
FIG. 1 is a front view illustrating an avatar refrigerator in accordance with the present invention.
Figure 2:
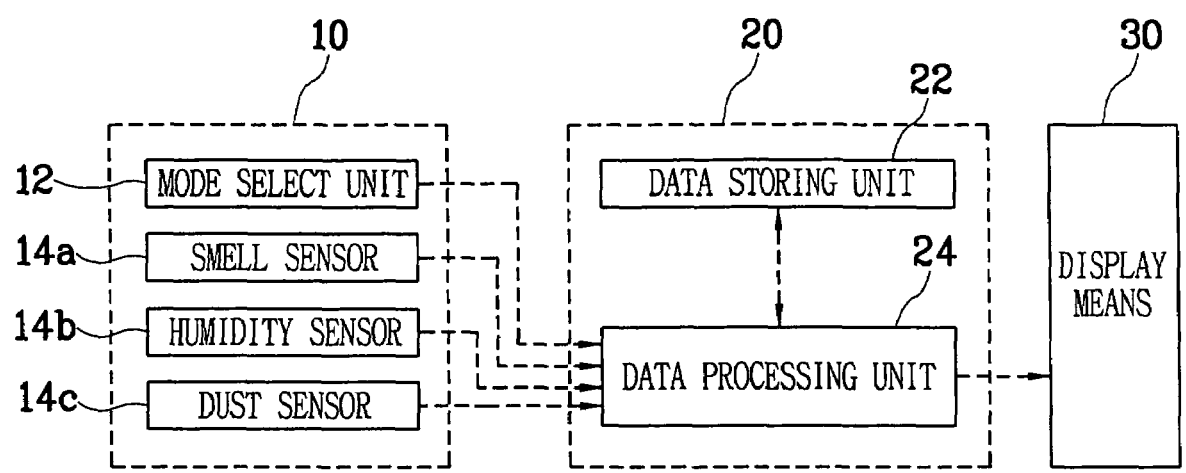
FIG. 2 is a block diagram illustrating the avatar refrigerator in accordance with the present invention.

Referring to FIGS. 1 and 2, in the avatar refrigerator, a freezing chamber and a refrigerating chamber are installed at both sides of a refrigerator main body (not shown) having its front surface opened, a freezing chamber door 2a and a refrigerating chamber door 2b are installed on the front surface of the refrigerator main body to be opened or closed, a control means 20 for controlling operations of various components is installed in the refrigerator main body, and a display means 30 for displaying the operational state of the refrigerator is installed on the front surface of the freezing chamber door 2a. When a contamination sensing mode is set through an input means 10 installed near the refrigerator main body, the freezing chamber door 2a and the refrigerating chamber door 2b, various sensors 14a, 14b and 14c measure various measurement values of the ambient air, and the control means 20 receives the measurement values from the sensors 14a, 14b and 14c, analyzes various contamination, examines contamination solving methods, and displays the contamination and the contamination solving methods through the display means 30.

Here, an evaporator (not shown) and a cool air circulation fan (not shown) for sending cool air are installed on the inner wall of the refrigerator main body, and a cool air circulation path (not shown) for circulating the cool air through the freezing chamber and the refrigerating chamber is formed in the refrigerator main body. A freezing cycle (not shown) including a compressor, a condenser, a capillary tube and an electronic expansion valve connected to the evaporator through refrigerant tubes is built in one side of the refrigerator main body. The cool air circulation fan and the compressor are controlled by the control means 20.

When the compressor is operated, refrigerants are circulated through the compressor, the condenser, the capillary tube, the electronic expansion valve and the evaporator, and when the cool air circulation fan is operated, the air cooled by the heat exchange with the evaporator is supplied to the freezing chamber and the refrigerating chamber.

One-side top and bottom ends of the freezing chamber door 2a and the refrigerating chamber door 2b are hinge-coupled to the front surface of the refrigerator main body, for sealing up the freezing chamber and the refrigerating chamber. An ice supply device 6 for supplying cold water or ice is installed on the front surface of the freezing chamber door 2a, and a home bar (not shown) for easily taking out beverages positioned inside the refrigerating chamber door 2b is installed on the front surface of the refrigerating chamber door 2b.

The ice supply device 6 and the home bar are positioned side by side on the front surfaces of the freezing chamber door 2a and the refrigerating chamber door 2b, so that the user can easily use them.

The input means 10 includes a mode select unit 12 disposed over the ice supply device 6 on the front surface of the freezing chamber door 2a, for setting one of a temperature control mode for controlling the temperature inside the refrigerator, and a contamination sensing mode for measuring various contamination of the air and providing contamination solving methods. The mode select unit 12 does not alternatively select the temperature control mode and the contamination sensing mode, but additionally sets or ends the contamination sensing mode during the temperature control mode.

The input means 10 includes a temperature control unit (not shown) for allowing the user to directly control the operational state of the refrigerator by inputting the set temperature of the refrigerator in the temperature control mode.

Here, the mode select unit 12 and the temperature control unit can be comprised of mechanical buttons to be pressed by the user, or electronic buttons displayed on the touch-screen type display means 30 to be pressed by static electricity.

In detail, when the temperature control mode is set by the mode select unit 12, the set temperatures of the freezing chamber and the refrigerating chamber are inputted through the temperature control unit, and the inside temperatures of the freezing chamber and the refrigerating chamber are controlled according to the set temperatures.

On the other hand, when the contamination sensing mode is set by the mode select unit 12, contamination is continuously sensed until the contamination sensing mode is ended. Here, the sensors 14a, 14b and 14c measure various contamination of the ambient air. Even if the contamination sensing mode is not set by the mode select unit 12, the sensors 14a, 14b and 14c can measure the measurement values of the ambient air at a set time or time interval by reservation setting, or intermittently measure the measurement values of the ambient air.

During the contamination sensing mode, the temperature control mode can also be performed to adjust the temperatures of the freezing chamber and the refrigerating chamber by controlling the operations of the inside components.

The sensors 14a, 14b and 14c are installed adjacently to the refrigerator main body and/or the freezing chamber door 2a and the refrigerating chamber door 2b, for measuring various contamination of the ambient air, such as smell, humidity and dust quantity in the contamination sensing mode.

In detail, the sensors 14a, 14b and 14c include smell sensors 14a for sensing a composition ratio of gas generating smell in the ambient air, humidity sensors 14b for measuring a humidity in the ambient air, and dust sensors 14c for measuring a dust quantity in the ambient air. The sensors 14a, 14b and 14c are connected to the control means 20, for transmitting the measurement values to the control means 20.

The smell sensors 14a, the humidity sensors 14b and the dust sensors 14c are evenly installed in each position around the refrigerator, for measuring contamination of the air in each position. For example, preferably, more smell sensors 14a are installed around the gas range to rapidly sense gas leakage, more humidity sensors 14b are installed in a bathroom using much water, and more dust sensors 14c are installed in a room of a child sensitive to dusts.

The sensors 14a, 14b and 14c can be connected to the control means 20 through wire, or perform wireless communication using an electric wave to transmit the measurement values to the control means 20. Here, the sensors 14a, 14b and 14c and the control means 20 can perform infrared data association receiving or transmitting information such as the measurement values through infrared rays, or Bluetooth, that is one of the local area wireless networking technology standards, embodying wireless data communication by 2.4 GHz ISM (Industrial, Scientific and Medical) band radio frequency in spite of obstacles.

The control means 20 controls the operations of the compressor and the cool air circulation fan in the temperature control mode, and includes a data storing unit 22 for storing the installation positions of the sensors 14a, 14b and 14c, the measurement values of the sensors 14a, 14b and 14c, reference values for comparison, and various contamination solving methods, and a data processing unit 24 for analyzing various contamination by comparing the reference values stored in the data storing unit 22 with the measurement values measured by the sensors 14a, 14b and 14c, selecting the contamination solving methods, and displaying the contamination and the contamination solving methods through the display means 30 with avatars in the contamination sensing mode.

The data storing unit 22 receives and stores the installation positions of the sensors 14a, 14b and 14c in advance. Here, the data storing unit 22 can manually receive the installation positions of the sensors 14a, 14b and 14c, or automatically receive the installation positions of the sensors 14a, 14b and 14c with the measurement values by wireless communication and accumulate the measurement values measured by the sensors 14a, 14b and 14c.

The data processing unit 24 precisely decides various contamination by analyzing the measurement values stored in the data storing unit 22. The data processing unit 24 decides contamination in each position by automatically receiving and analyzing the installation positions and the measurement values of the sensors 14a, 14b and 14c stored in the data storing unit 22, or decides various contamination in a specific position by manually setting the specific position and receiving the measurement values of the sensors 14a, 14b and 14c in the specific position. Furthermore, the data processing unit 24 provides the contamination solving methods.

That is, the data processing unit 24 displays various contamination and contamination solving methods through the display means 30 with avatars, and also displays contamination in each position on the residential space through the display means 30.

The display means 30 is installed at one side of the mode select unit 12, so that the user can easily confirm the display means 30. Preferably, the display means 30 is an LCD having a speaker.

The operation of the display means 30 is controlled by the data processing unit 24. Especially, in the contamination sensing mode, the display means 30 can display various contamination, the contamination solving methods and contamination in each position by characters, numbers, warning lamps, warning sounds, avatars and pictures.

The display means 30 can display various contamination with the avatars or to correspond to the avatars. For example, when the dust contamination is high in the air, the dust contamination is displayed with a coughing bear, or when the dust contamination increases, the dust contamination is displayed with a larger bear.

Figure 3:
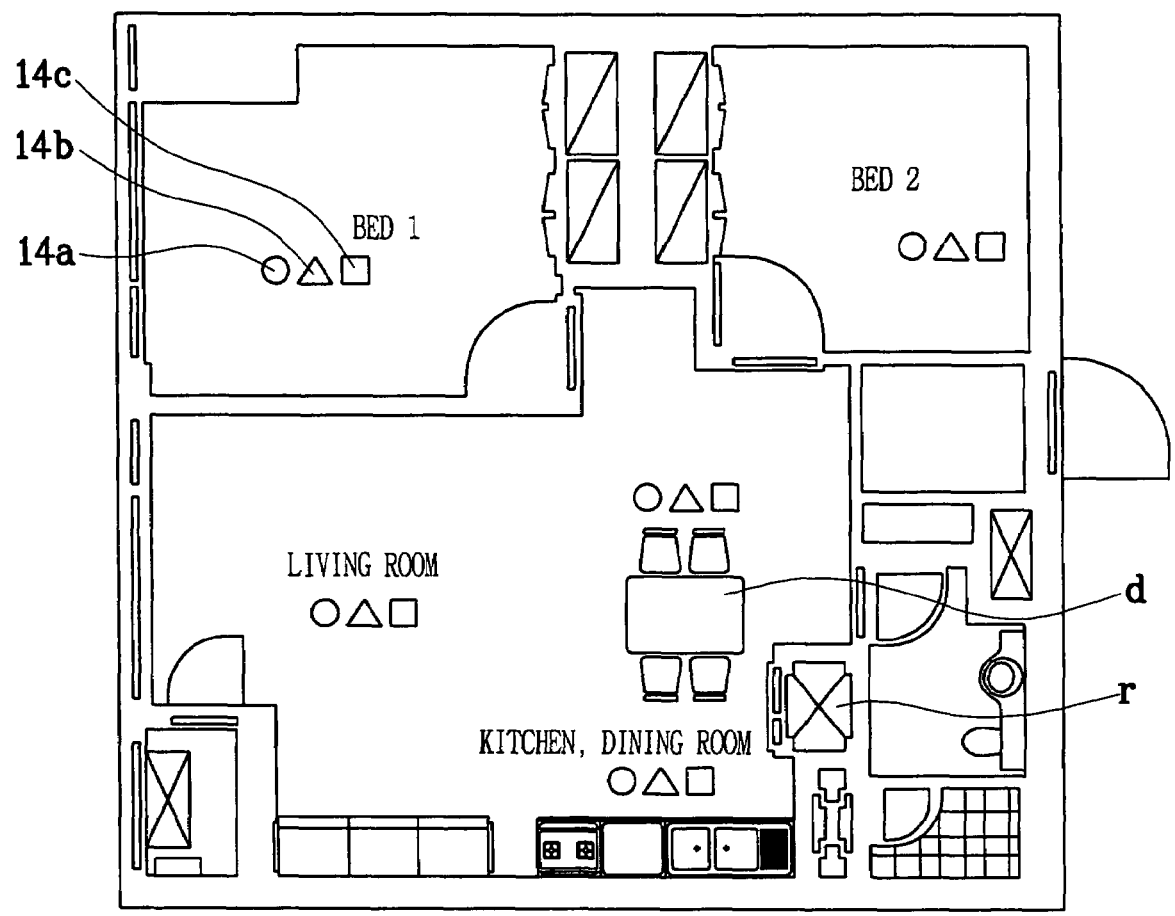
FIG. 3 is a plane view illustrating the avatar refrigerator installed in a residential space in accordance with the present invention.

One installation example of the avatar refrigerator will now be explained with reference to FIG. 3. In the case that the residential space includes bedroom 1, bedroom 2, a living room and a kitchen and the avatar refrigerator (r) is installed in the kitchen, the smell sensors 14a, the humidity sensors 14b and the dust sensors 14c evenly installed in the residential space measure the measurement values.

The sensors 14a, 14b and 14c of each position can automatically transmit the measurement values to the data storing unit 22, or the sensors 14a, 14b and 14c of the specific position selected by the user can transmit the measurement values to the data storing unit 22. The data processing unit 24 decides each contamination according to the measurement values stored in the data storing unit 22.

For example, when the measurement values measured by the dust sensors 14c increase over the set values, the data processing unit 24 can display the dust contamination corresponding to the whole residential space or the specific position through the display means 30 by numbers, warning lamps and warning sounds, display the contamination solving method with the avatar for ventilating the space or operating the air conditioner, and display the contamination warning around the table (d) that must be specially cleaned in consideration of contamination in each position.

FIG. 4 is a flowchart showing sequential steps of the method for sensing contamination of the avatar refrigerator in accordance with the present invention. The operation of the avatar refrigerator will now be described with reference to FIG. 4.

In the first step, when the contamination sensing mode is set, the position of the residential space whose contamination is intended to be measured is selected, and the measurement values are measured by each sensor 14a, 14b and 14c (S1 to S3).

When the user selects the contamination sensing mode during the temperature control mode by pressing the mode select unit 12, the sensors 14a, 14b and 14c measure various measurement values of the air in the installation positions. In the case that the user performs reservation setting of automatically converting the temperature control mode to the contamination sensing mode at a predetermined time interval, the sensors 14a, 14b and 14c measure the measurement values at the preset time or time interval.

If the user does not perform reservation setting, the data processing unit 24 enables the sensors 14a, 14b and 14c to automatically randomly intermittently measure the measurement values.

In addition, the user can measure the measurement values in the whole positions or the specific position by the sensors 14a, 14b and 14c.

Since the smell sensors 14a, the humidity sensors 14b and the dust sensors 14c are randomly installed in the residential space, the sensors 14a, 14b and 14c measure the measurement values including the composition ratio of gas, the humidity and the dust quantity, and transmit the measurement values to the control means 20 by wireless communication.

In the second step, the kinds and degrees of contamination in each position are decided by comparing the various measurement values measured in the first step with the reference values, and displayed with the avatars (S4 and S5).

The data processing unit 24 precisely decides contamination by accumulating the measurement values transmitted from the sensors 14a, 14b and 14c by wireless communication in the data storing unit 22, and using variations of the measurement values. The data processing unit 24 decides contamination or non-contamination and the kinds and degrees of contamination by comparing the measurement values from the sensors 14a, 14b and 14c with the reference values.

Since the data processing unit 24 receives the installation positions of the sensors 14a, 14b and 14c and different reference values of each position in advance, the data processing unit 24 decides the kinds and degrees of contamination in each position by comparing the measurement values of the sensors 14a, 14b and 14c with the reference values of the sensors 14a, 14b and 14c in each position.

For example, in the case of the reference values in each installation position of the dust sensors 14c, the reference values of the dust sensors 14c are preferably smaller in the bedroom of the child sensitive to dust or the kitchen that must be maintained clean than in the other spaces. In addition, the reference values of the smell sensors 14a and the humidity sensors 14b are preferably set different in each position. The kinds and degrees of contamination can be more precisely decided by setting different reference values of the sensors 14a, 14b and 14c in each position.

As described above, the data processing unit 24 decides the kinds and degrees of contamination such as smell, humidity and dust according to the measurement values of the sensors 14a, 14b and 14c. Furthermore, the data processing unit 24 precisely decides the kinds and degrees of contamination in consideration of the installation positions of the sensors 14a, 14b and 14c, and displays the kinds and degrees of contamination through the display means 30 by characters, numbers, warning sounds, warning lamps, avatars and pictures.

For example, when the measurement value measured by the humidity sensor 14b is over a discomfort index, the data processing unit 24 can display the measured humidity through the display means 30 by the number, notify it by the warning sound or warning lamp, and provide the picture showing wet clothes or the avatar having an unpleasant look. Especially, the data processing unit 24 can display the high humidity position of the residential space by contamination warning.

In the third step, the contamination solving methods are decided and displayed according to the kinds and degrees of contamination in each position decided in the second step (S5 and S7).

The data processing unit 24 selects the appropriate contamination solving methods according to the kinds and degrees of contamination among the contamination solving methods stored in the data processing unit 22, and displays the contamination solving methods through the display means 30 with the avatars.

For example, when the measurement value measured by the smell sensor 14a is analyzed, if ammonia contamination is decided by the composition ratio of ammonia higher than the reference value, the avatar for ventilating the residential space or operating a humidifier is displayed through the display means 30.

As discussed earlier, in accordance with the present invention, the avatar refrigerator and the method for sensing contamination of the same receive the measurement values from various sensors installed around the refrigerator in the contamination sensing mode, decide the kinds and degrees of contamination in each position by analyzing the measurement values of the sensors by the control means, decide the contamination solving methods, and display the kinds and degrees of contamination in each position and the contamination solving methods through the display means formed at the refrigerator door side with the avatars. As a result, the avatar refrigerator and the method for sensing contamination of the same maintain the clean air environment and improve health by notifying the air contamination in the peripheral regions of the refrigerator installed at the center of the residential space and the contamination solving methods as well as freshly maintain the foods by storing the foods at a low temperature.

The side by side type refrigerator in which the freezing chamber and the refrigerating chamber are arranged side by side has been explained in detail on the basis of the preferred embodiments and accompanying drawings. Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. An avatar refrigerator, comprising:
   a plurality of sensors installed in an indoor space in which the refrigerator has been installed and the sensors installed exterior to a main body of the refrigerator, for sensing contamination of ambient air exterior to the refrigerator and providing sensed dated based on the sensed contamination;
   control means built in the refrigerator, for receiving the sensed data from the sensors and deciding degrees and/or kinds of contamination of the indoor space in a contamination sensing mode; and
   display means installed at one side of the refrigerator to be connected to the control means, for displaying the degrees and/or the kinds of contamination of the indoor space with avatars in the contamination sensing mode.

2. The avatar refrigerator of claim 1, wherein the control means determines contamination solving methods according to the degrees and/or the kinds of contamination sensed by the sensors, and the display means displays the contamination solving methods with the avatars.

3. The avatar refrigerator of claim 1, wherein the control means displays the degrees and/or the kinds of contamination in the indoor space through the display means to correspond to avatars.

4. The avatar refrigerator of claim 2, wherein the sensors are randomly installed in positions of the indoor space exterior to the refrigerator, and the control means receives measurement values and installation positions of the sensors, decides the degrees and/or the kinds of contamination in each position, and the display means displays the degrees and/or the kinds of contamination.

5. The avatar refrigerator of claim 4, wherein the sensors comprise at least one of smell sensors for sensing a composition ratio of gas generating smell in the air, humidity sensors for sensing a humidity, and dust sensors for sensing a dust quantity in the air.

6. The avatar refrigerator of claim 4, wherein the sensors and the control means communicate with each other by infrared data association or Bluetooth, so that the measurement values of the sensors can be transmitted to the control means.

7. The avatar refrigerator of claim 4, wherein the control means receives the measurement values from the sensors at a preset time or time interval in the contamination sensing mode.

8. The avatar refrigerator of claim 4, wherein the control means intermittently receives the measurement values from the sensors in the contamination sensing mode.

9. A method for sensing contamination of an avatar refrigerator, comprising:
measuring a plurality of measurement values of air in an indoor space in which the refrigerator has been installed by using sensors provided exterior to the refrigerator;
receiving the plurality of measurement values and deciding information regarding contamination of the indoor space; and
displaying the information regarding the contamination of the indoor space using avatars, the displaying occurring on one side of the refrigerator.

10. The method of claim 9, wherein the deciding includes determining contamination solving methods based on the contamination, and the displaying includes displaying the contamination solving methods with avatars.

11. The method of claim 10, wherein the measuring includes randomly measuring the plurality of measurement values of the air, the deciding includes receiving the plurality of measurement values of the air in each position, and deciding the contamination in each position, and the displaying includes displaying the contamination in each position.

12. The method of claim 11, wherein the measuring of the air comprises at least one of a composition ratio of gas generating smell in the air, a humidity and a dust quantity of the air.

13. The method of claim 11, wherein the receiving comprises receiving the measurement values of the air by infrared data association or Bluetooth.

14. The method of claim 11, wherein the receiving includes receiving the measurement values of the air at a preset time or time interval.

15. The method of claim 11, wherein the receiving includes intermittently receiving the plurality of measurement values of the air.

16. An avatar refrigerator comprising:
a plurality of sensors installed exterior to a freezing chamber and a refrigerating chamber of the refrigerator, the sensors to sense air exterior to the freezing chamber and the refrigerating chamber;
a control device to receive data from the sensors and to determine information regarding the sensed data; and
a display device on one side of the refrigerator to display the information regarding the sensed data.

17. The avatar refrigerator of claim 16, wherein the control device determines at least one contamination solving method based on the sensed data, and the display device displays the at least one contamination solving method with the avatars.

18. The avatar refrigerator of claim 16, wherein the plurality of sensors comprise at least one of a smell sensor to sense a composition ratio of the air, a humidity sensor to sense a humidity, or a dust sensor to sense a dust quantity in the air.

19. The avatar refrigerator of claim 16, wherein the sensors and the control device communicate with each other using infrared data association or Bluetooth.

20. The avatar refrigerator of claim 16, wherein the control device receives the data from the sensors at preset times or time intervals.

21. The avatar refrigerator of claim 16, wherein the control device intermittently receives the data from the sensors in the contamination sensing mode.

* * * * *